United States Patent
Embretson

(10) Patent No.: US 6,877,989 B2
(45) Date of Patent: Apr. 12, 2005

(54) COMPUTER PROGRAM FOR GENERATING EDUCATIONAL AND PSYCHOLOGICAL TEST ITEMS

(75) Inventor: Susan Embretson, Lawrence, KS (US)

(73) Assignee: Psychological DataCCorporation, Lawrence, KS (US)

( * ) Notice: Subject to any disclaimer, the term of this patent is extended or adjusted under 35 U.S.C. 154(b) by 261 days.

(21) Appl. No.: 10/078,083

(22) Filed: Feb. 15, 2002

(65) Prior Publication Data

US 2003/0157469 A1 Aug. 21, 2003

(51) Int. Cl.[7] .............................................. G09B 19/00
(52) U.S. Cl. ...................... 434/236; 434/169; 434/362
(58) Field of Search ......................... 434/81, 98, 116, 434/118, 169, 178, 201, 258, 236–238, 307 R, 308, 322, 323, 362, 365; 273/273, 446, 45, 460, 454; 600/300, 544, 545; 706/45, 52; 351/203

(56) References Cited

U.S. PATENT DOCUMENTS

| | | | | |
|---|---|---|---|---|
| 4,332,566 A | * | 6/1982 | Mazeski et al. | 434/178 |
| 4,755,140 A | * | 7/1988 | Rimland | 434/236 |
| 4,770,636 A | * | 9/1988 | Buschke | 434/236 |
| 5,727,951 A | * | 3/1998 | Ho et al. | 434/362 |
| 5,855,011 A | * | 12/1998 | Tatsuoka | 706/45 |
| 5,927,988 A | * | 7/1999 | Jenkins et al. | 434/116 |
| 6,004,135 A | * | 12/1999 | Trattner et al. | 434/169 |
| 6,309,361 B1 | * | 10/2001 | Thornton | 600/544 |
| 6,382,791 B1 | * | 5/2002 | Strawderman et al. | 351/203 |
| 6,632,174 B1 | * | 10/2003 | Breznitz | 600/300 |
| 6,652,283 B1 | * | 11/2003 | Van Schaack et al. | 434/236 |
| 6,663,392 B2 | * | 12/2003 | Leyva et al. | 434/236 |

* cited by examiner

Primary Examiner—Joe H. Cheng
(74) Attorney, Agent, or Firm—Hovey Williams LLP

(57) ABSTRACT

A computer program (10) and a method for creating non-verbal test items (20) to target a level and a cognitive source of item difficulty for psychological tests comprising a test configuration module (30) for choosing an ability to be tested, an item type, and a general appearance of the items (20), an item specification module (40) for choosing one of a plurality of blueprints, and an item creation module (50) for creating each item (20). Each item (20) comprises a stem (90) and a list of response alternatives (100). Both the stem (90) and the list of response alternatives (100) each comprise a plurality of objects (110). The blueprints allow a user to create and immediately use the items (20) without having to conduct empirical tryouts. Tests can be administered either as fixed-content paper tests, fixed-content computer tests, or adaptive-content computer tests.

20 Claims, 3 Drawing Sheets

COMPUTER PROGRAM FOR GENERATING EDUCATIONAL AND PSYCHOLOGICAL TEST ITEMS

BACKGROUND OF THE INVENTION

1. Field of the Invention

The present invention relates to psychological testing. More particularly, the present invention relates to a computer program and a method for creating non-verbal test items to target levels and cognitive sources of item difficulty for psychological intelligence tests.

2. Description of Prior Art

Common intelligence tests use non-verbal items to measure examinees' complex reasoning and judgment skills, which have been shown to best reflect intelligence. Matrix completion items are often viewed as the single best item type to measure intelligence, but other item types, such as, figural analogies, figural series, figural classifications, cube folding, and object assembly also appear on intelligence tests. These item types are typically administered in a multiple choice format where the task is to select the alternative that fulfills the relationships defined in the item.

For example, matrix completion problems present test subjects with a matrix of objects, each object comprising specific attributes. Each attribute may be shared with one or more of the other objects, in specific combinations, thereby rendering each object unique.

Test subjects are also presented with a list of response alternatives, which comprises a number of objects similar to the objects in the matrix. One of the objects in the list of response alternatives comprises attributes, in specific combination such that it completes the matrix.

The matrix and the list of response alternatives, in combination, form a non-verbal test item. A number of items are used in each test. Items are typically created by human item writers guided by loose sets of specifications concerning desired attributes. Quite often, item writers are shown previous tests and told to make items like those on previous tests. Item writers may also be given general guidelines about certain attributes and desired difficulty, particularly in relation to previous tests.

However, items are largely unspecified and actual item creation depends on the skill and judgment of individual item writers. While item writers may use computer drawing programs to develop arrangements of objects for each item created, item writers choose not only specific objects, but also their arrangement. Since item writers are generally artists, psychometric properties, such as item difficulty, are beyond their scope and can only be known after empirical tryouts on appropriate groups of test subjects.

Furthermore, item creation has not been influenced by recent research findings. Several studies provide a basis of algorithmic item creation, which lessens the role of human item writers. In algorithmic item creation, item writers must still create each item, but item creation is controlled by a more elaborate set of specifications. These specifications contain specific cognitive sources of item difficulty supported by research on cognitive models for various item types. Therefore, item difficulty levels may be predicted reasonably well for such items.

However, these specifications are not complete and human item writers are still required to choose objects and attributes, and then combine them into each item. As in standard item creation practices, algorithmic item creation still depends on human skill and judgment, but to a lesser extent. Also, item creation remains time consuming and items are not available immediately. Therefore, items cannot be quickly created to specifically target levels and cognitive sources of item difficulty.

Accordingly, there is a need for an improved method of creating non-verbal test items to target levels and cognitive sources of item difficulty that overcomes the limitations of the prior art.

SUMMARY OF THE INVENTION

The computer program and method for psychological testing of the present invention overcomes the above-identified problems and provides a distinct advance in the art of psychological testing. More particularly the present invention provides a computer program and a method for creating non-verbal test items to target levels and cognitive sources of item difficulty for psychological intelligence tests.

The computer program broadly comprises a test configuration module for choosing global features of the items, an item specification module for choosing one of a plurality of blueprints for each item, and an item creation module for creating each item. Each item comprises a stem and a list of response alternatives. Both the stem and the list of response alternatives each comprise a plurality of objects.

The global features include an ability to be tested, an item type, and a general appearance. The general appearance is a result of a choice of one of a plurality of libraries and perceptual display properties. The libraries are a collection of objects and attributes that can be selected randomly by the item creation module in creating each item, such as shapes, colors, fill patterns, and line characteristics.

Each blueprint specifies a number of objects for both the stem and the list of response alternatives, as well as, arrangement of objects and variability of the attributes of the objects in both the stem and the list of response alternatives. The number of objects, arrangement of objects, and variability of the attributes determine a cognitive source of item difficulty and therefore a predicted item difficulty.

Each blueprint is based on research that determined relationships between the number of objects, arrangement of objects, variability of attributes, and item difficulty level. These relationships also effect item validity, which is a result of each item's ability to measure intelligence, as determined by the research. The blueprints allow a user to create and immediately use the items without having to conduct empirical tryouts.

The item creation module creates each item by randomly populating each stem and each list of response alternatives with objects according to the global features and the blueprint.

In this manner, items are created for use in psychological intelligence tests. Tests can be administered either as fixed-content paper tests, fixed-content computer tests, or adaptive-content computer tests. The adaptive-content computer tests comprise a computer picking or creating items based on answers given to previous items to provide the most information about an examinee's intelligence.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
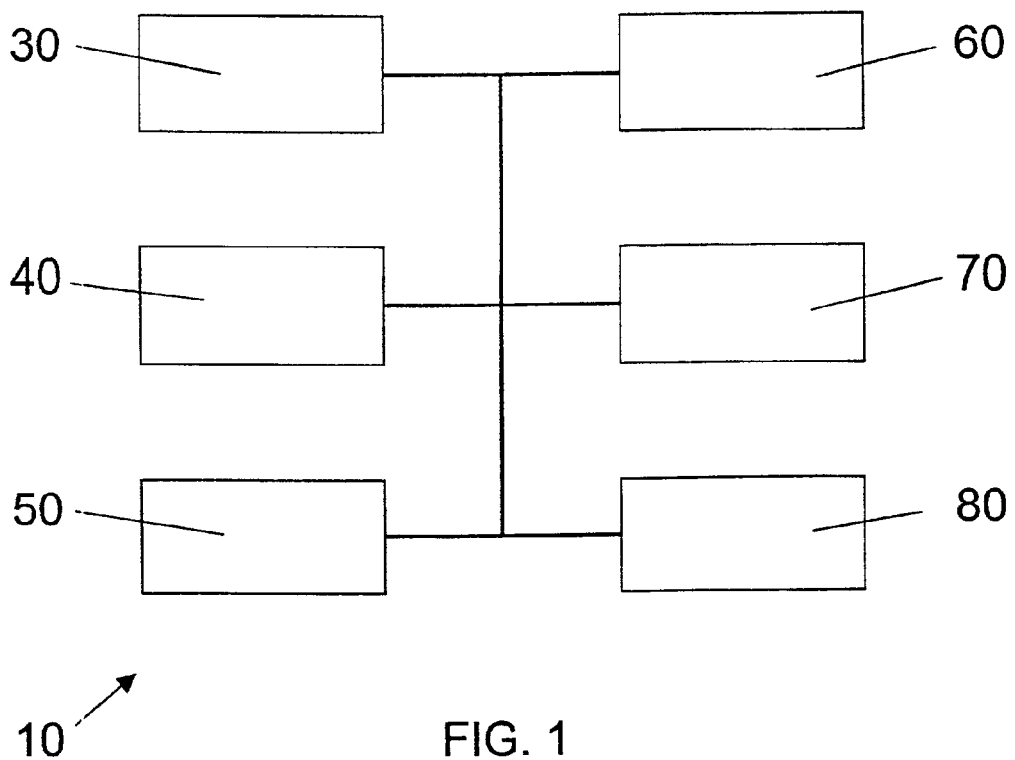
FIG. 1 is a block diagram of a computer program of the present invention.
Figure 2:
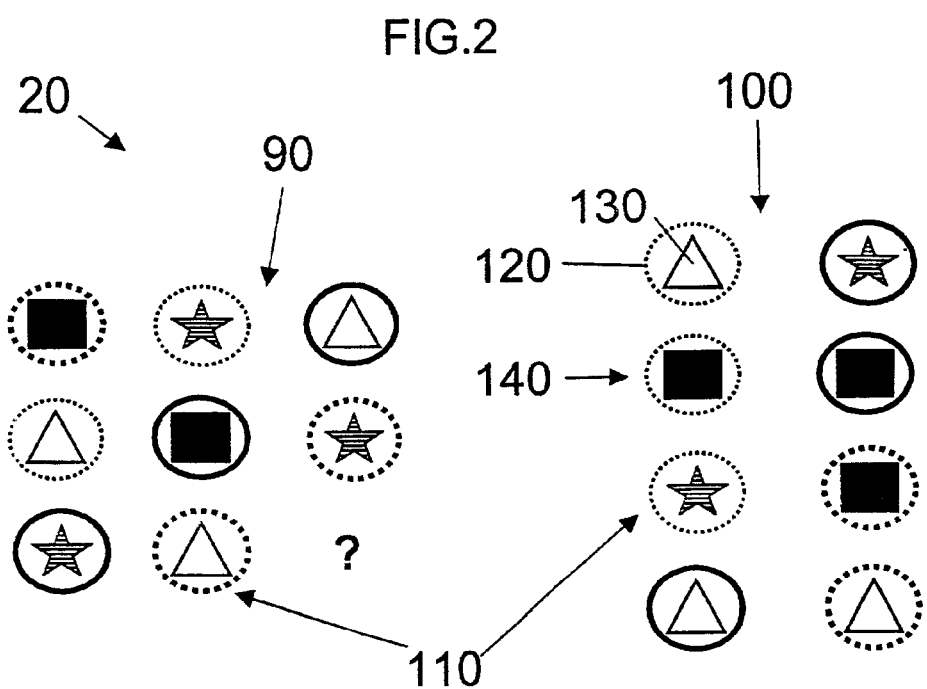
FIG. 2 is a view of a sample non-verbal test item created by the program.

Referring to FIG. 1 and FIG. 2, a computer program 10 for creating non-verbal test items to target levels and cognitive sources of item difficulty for psychological intelligence tests is shown written in accordance with a preferred embodiment of the present invention. The preferred program 10 creates non-verbal test items 20 and broadly comprises a test configuration module 30 for choosing global features of the items 20, an item specification module 40 for choosing one of a plurality of blueprints for each item 20, and an item creation module 50 for creating each item 20. The program 10 also includes an onscreen display module 60 for displaying each item 20, an item image module 70 for creating an image file of each item 20, and an item structure module 80 that creates a specification code file of each item 20.

Typically, a number of items 20 are used in each test to measure test subjects' non-verbal complex reasoning and judgment skills with respect to one or more specific abilities. The program 10 of the present invention produces items 20 to measure test subjects' analytic reasoning and/or spatial ability skills. Additionally, the program can create different item types for each ability to be tested. Analytic reasoning can be measured with 2×2 matrix completion items, 3×3 matrix completion items, analogy items, or classification items. Spatial ability can be measured with either object assembly items or cube folding items.

For example, matrix completion problems present test subjects with an incomplete matrix, referred to as a stem 90, and a list of response alternatives 100. Both the stem 90 and the list of response alternatives 100 each comprise a plurality of objects 110, each object 110 comprising specific attributes. Each attribute may be shared with one or more of the other objects 110, in specific combinations, thereby rendering each object 110 unique. One of the objects 110 in the list of response alternatives 100 comprises attributes, in specific combination such that it completes the matrix.

FIG. 2 depicts a sample matrix completion test item 20. The sample item 20 of FIG. 2 is a 3×3 matrix item designed to measure test subjects' analytic reasoning skills. The stem 90 is shown on the left and the list of response alternatives 100 is shown on the right and each comprise a plurality of objects 110. The stem 90 includes a question mark in its lower right-hand corner. Test subjects are expected to select the object 110 from the list of response alternatives 100 that can replace the question mark in order to complete the matrix.

In the case of the sample item 20, each object 110 comprises a circle 120 and an article 130 within the circle 120. Attributes of the circle 120 include a line thickness and a dash style. For example, some of the circles 120 have thick solid lines. Other circles 120 have thick dashed lines. Still other circles 120 have thin dashed lines.

Attributes of the article 130 include a shape and a fill pattern. For example, some of the articles 130 have solid filled squares. Other articles 130 have horizontal-line filled stars. Still other articles 130 have non-filled triangles. As can be seen, each article 130 uses one fill pattern for a given shape.

As is apparent in the sample item 20, each complete row and each complete column of the stem 90 includes objects 110 with every shown line thickness, dash style, shape, and fill pattern. For example, each complete row and each complete column includes a square, a triangle, and a star. Furthermore, each complete row and each complete column includes a thick solid circle, a thick dashed circle, and a thin dashed circle.

Therefore, object 140 would complete the matrix. Object 140 would provide every column and every row of the stem 90 with every shown line thickness, dash style, shape, and fill pattern.

Test subjects are scored according to their skill in correctly selecting the object that completes the matrix. Since items 20 have an associated level of item difficulty, test subjects are also scored according to the associated level of item difficulty. Additionally, since each item targets a specific cognitive source of item difficulty, test subjects can be evaluated for their skill with respect to the specific cognitive source of item difficulty.

The global features include an ability to be tested, an item type, and a general appearance. The ability to be tested is chosen from a choice of analytic reasoning and spatial ability. The item type depends on which ability to be tested is chosen. If analytic reasoning is chosen, the item type is chosen from a choice of 2×2 matrix completion items, 3×3 matrix completion items, analogy items, and classification items. If spatial ability is chosen, the item type is chosen from a choice of object assembly items and cube folding items.

The general appearance is a result of a choice of one of a plurality of libraries and perceptual display properties. The libraries are a collection of objects 110 and attributes that can be used in creating each item 20, such as shapes, colors, fill patterns, and line characteristics. The libraries are preferably supplied with the program 10, but can also be created to work with the program 10. The perceptual display properties include relative horizontal scaling, vertical scaling, and aspect ratio of the objects 110.

The user is given a choice of approximately fifty blueprints for each item type. The choice of blueprints is dependant upon which item type is chosen. Each blueprint specifies a number of objects 110 for both the stem 90 and the list of response alternatives 100, as well as, arrangement of objects 110 and variability of the attributes of the objects 110 in both the stem 90 and the list of response alternatives 100. The number of objects 110, arrangement of objects 110, and variability of the attributes determine a specific cognitive source of item difficulty and therefore a predicted item difficulty level.

Each blueprint is based on research that determined relationships between the number of objects 110, arrangement of objects 110, variability of attributes, and item difficulty level. These relationships also effect item validity, which is a result of each item's ability to measure intelligence as determined by the research. Since the blueprints are based on research, they allow a user to create and immediately use items 20 to target a specific level and cognitive source of item difficulty without having to conduct empirical tryouts on appropriate groups of test subjects for each item created.

The item creation module 50 creates each item 20 by populating each stem 90 and each list of response alternatives 100 with objects 110 according to the chosen global features and blueprint. Objects 110 and attributes are selected randomly from the chosen library by the item creation module 50 within constraints and assembled according to the chosen blueprint. Constraints are a set of rules limiting combinations of objects 110 and/or attributes that produce ineffective items 20. The item creation module 50 also creates each item 20 with one randomly placed object 110 in the list of response alternatives 100 that represents a correct answer. Each item 20 is also assigned an unique name, which is a derivative of the chosen blueprint and an order of creation.

The onscreen display module 60 displays each item 20 on a monitor or other system display. The user may interact with the items 20 and control traits, such as background color. The user may also determine which object 110 in the list of response alternatives 100 represents the correct answer by clicking on each object 110 in the list of response alternatives 100. The program 10 notifies the user whether or not the object 110 he or she just clicked on represents the correct answer.

The item image module 70 creates the image file in GIF or JPEG image file format. The image file is an exact reproduction of the item 20 displayed in the onscreen display module 60 and may be used for creating fixed-content paper tests, fixed-content computer tests, or adaptive-content computer tests.

The item structure module 80 creates a specification code file that lists exact specifications for each item 20 and allows the program 10 to create an exact duplicate of each item 20. Thus, the specification code file may be used to electronically transport each item 20 from one computer to another. The specification code file may also be used for creating fixed-content or adaptive-content computer tests.

In this manner, items 20 are created for use in psychological intelligence tests. Items 20 are selected from those created and grouped to make up each test. Tests can be administered either as fixed-content paper tests, fixed-content computer tests, or adaptive-content computer tests. The adaptive-content computer tests comprises a computer picking items 20 based on answers given to previous items. Additionally, the computer can create items 20 based on answers given to previous items 20, using the item creation module 50.

Either fixed-content computer tests or adaptive-content computer tests may be given on a stand-alone personal computer or a networked computer. The networked computer may include, but does not necessarily require, the item creation module 50 running locally. Additionally, the program 10 and the items 20 are adaptable to be used over the Internet.

Additionally, the user may modify portions of the program 10. The user may add objects and attributes to or modify the objects and attributes in the libraries. The user may also add to or modify the blueprints and constraints. These modifications allow the user to update the program 10 with new research results, as well as, customize the program 10 for a particular application.

Items 20 similar to the one shown in FIG. 2, are commonly used in psychological intelligence tests. Similarly, research supports use of items 20 that target specific sources of cognitive complexity. However, it can be seen that the program 10 of the present invention can quickly create items 20 that target specific sources of cognitive complexity, making it possible to create items 20 based on answers given to previous items 20 during a common testing session. This allows the computer to quickly and accurately find and assess an individual test subject's true ability.

Furthermore, the program 20 creates items 20 with a degree of consistency that only a computer can provide. Humans are not as adept at consistency, as are computers. Therefore, the program 10 ensures that the item difficulty level and the item validity are more predictable and consistent than a human item writer can provide, which leads to more accurate and efficient tests.

The program 10 is written in JAVA allowing it to be integrated with Internet based applications and thereby create items 20 over the Internet. The program 10 includes typical graphic user interface features such as Toolbars, Pull-Down Lists, Radio Buttons, and Menus. The user uses these features to make choices and otherwise interact with the program 10.

While the contemplated embodiment of the present invention has been described above, it is understood that other abilities to be tested and/or item types can be substituted. Additionally, the item image module 70 may create the image file in other standard image file formats, such as, for example, TIFF. Furthermore, while the preferred embodiment is in the form of a computer program, the present invention can be implemented in other forms, such as, a book that directs the user to sections or pages of the book based on choices made by the user. These and other minor modifications are within the scope of the present invention.

Figure 3:
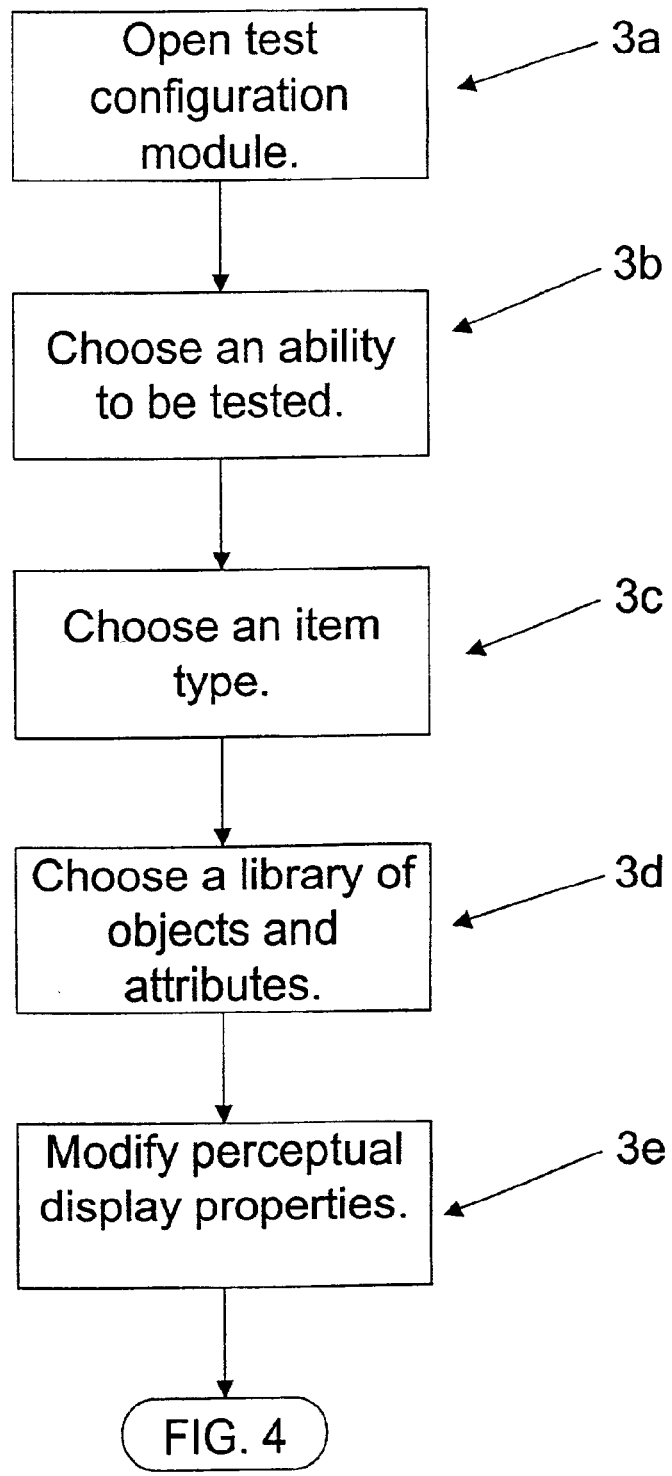
FIG. 3 is a flow chart showing a first portion of an item creation procedure.
Figure 4:
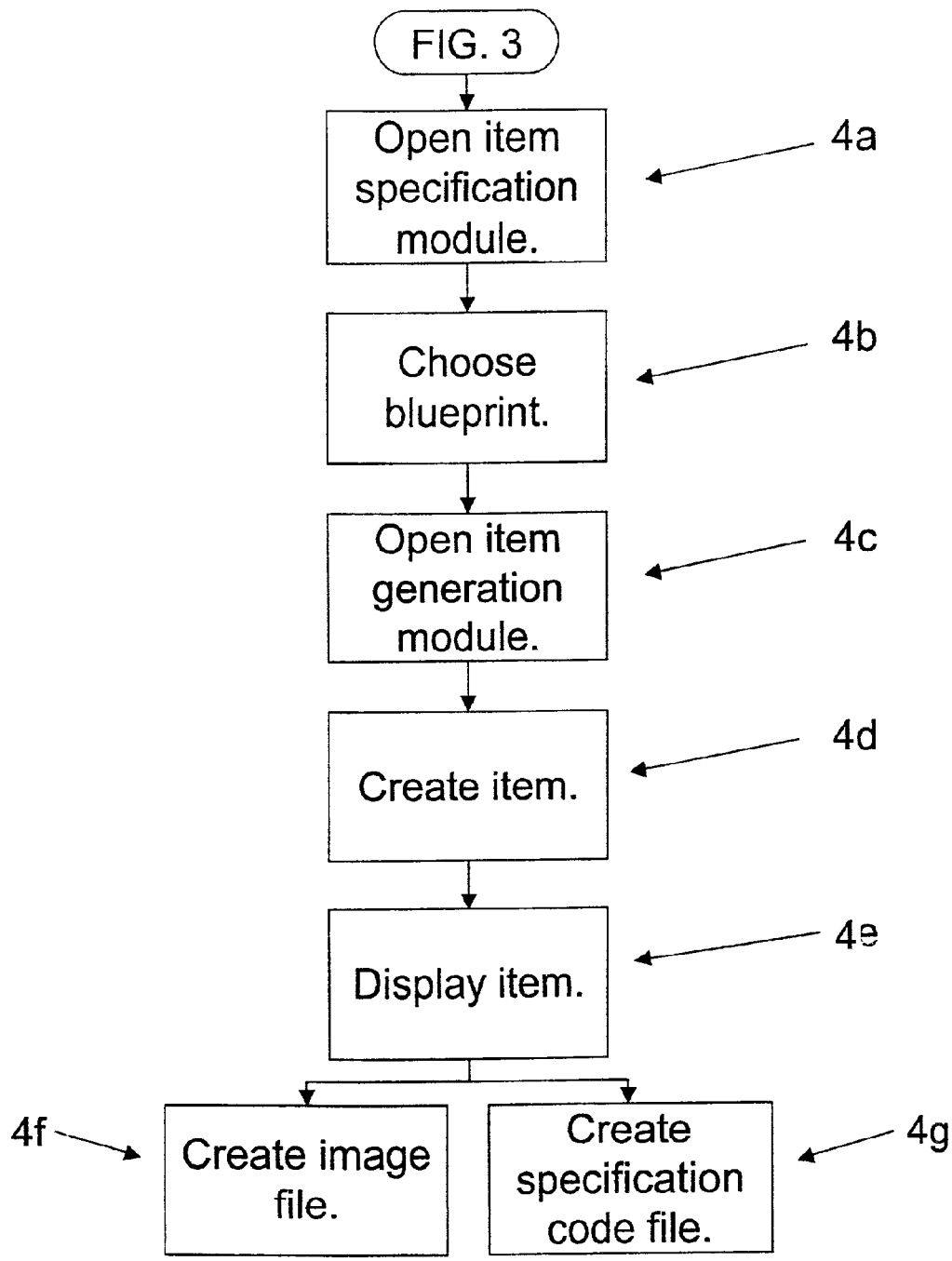
FIG. 4 is a flow chart showing a second portion of the item creation procedure.

The flow charts of FIG. 3 and FIG. 4 show the functionality and operation of a preferred implementation of the present invention in more detail. In this regard, some of the blocks of the flow charts may represent a module segment or portion of code of the program 10 of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

In use, as shown in FIG. 3, the user initiates the program 10 and opens the test configuration module 30, as depicted in step 3a. The user then chooses the ability to be tested from the choice of analytic reasoning and spatial ability, as depicted in step 3b. The user then chooses the item type, from the choice of item types, as depicted in step 3c.

The choice of item types depends on the chosen ability to be tested. For instance, if the user chooses analytic reasoning in step 3b, the user is given the choice of either 2×2 matrix completion items, 3×3 matrix completion items, analogy items, and classification items in step 3c. Alternatively, if the user chooses spatial ability in step 3b, the user is given the choice of either object assembly items or cube folding items in step 3c.

Once the item type has been chosen, the user chooses one of the libraries of objects 110 and attributes, thereby choosing features such as shapes, colors, fill patterns, and line characteristics of the objects 110, as depicted in step 3d. The user can modify perceptual display properties including horizontal scaling, vertical scaling, and aspect ratio of the objects 110 as depicted in step 3e.

As shown in FIG. 4, the user then opens the item specification module 40, as depicted in step 4a. The user then chooses the blueprint from a choice of blueprints according to the chosen item type, as depicted in step 4b. The choice of blueprints includes information concerning level and cognitive source of item difficulty for each blueprint. Thus, the user can target the level and the cognitive source of item difficulty for each item 20 by his or her choice of blueprint.

Once the blueprint has been selected, the user opens the item creation module 50, as depicted in step 4c. The user then commands the program 10 to create the item 20, as depicted in step 4d. The program 10 randomly selects objects 110 and attributes from the chosen library and arranges them according to the chosen blueprint. While arrangement of the objects 110 in the stem 90 is specified by the blueprint, the program 10 randomly places the correct answer in the list of response alternatives 100.

Once the item 20 has been created, the user can display the item 20, as depicted in step 4e. If the user is satisfied with the item 20, he or she may create the image file, as depicted in step 4f, and/or create the specification code file, as depicted in step 4g.

Having thus described a preferred embodiment of the invention, what is claimed as new and desired to be protected by Letters Patent includes the following:

1. A device for creating a non-verbal test item to target a level and a cognitive source of item difficulty, the device comprising:
   an item specification module operable to allow the user to choose one of a plurality of blueprints, wherein each blueprint targets a specific level and cognitive source of item difficulty according to research; and
   an item creation module operable to create the item by randomly selecting objects and attributes according to the chosen blueprint.

2. The device as set forth in claim 1, wherein the item is created according to constraints which limit combinations of objects and attributes that produce ineffective items.

3. The device as set forth in claim 1, further comprising an item image module operable to create an image file of the item in a standard image file format.

4. The device as set forth in claim 1, further comprising an item structure module operable to create a specification code file that can be used to recreate the item.

5. A device for creating a non-verbal test item to target a level and a cognitive source of item difficulty, the device comprising:
   a test configuration module operable to allow a user to choose one of a plurality of item types and one of a plurality of libraries of objects and attributes;
   an item specification module operable to allow the user to choose one of a plurality of blueprints for the chosen item type, wherein each blueprint targets a specific level and cognitive source of item difficulty according to research; and
   an item creation module operable to create the item by randomly selecting objects and attributes from the chosen library and according to the chosen blueprint.

6. The device as set forth in claim 5, wherein the plurality of item types the user is allowed to choose from is dependant upon which one of a plurality of abilities to be tested is chosen.

7. The device as set forth in claim 6, wherein the plurality of abilities to be tested consists of analytic reasoning and spatial ability.

8. The device as set forth in claim 7, wherein if analytic reasoning is chosen as the ability to be tested then the plurality of item types consists of 2×2 matrix completion items, 3×3 matrix completion items, analogy items, and classification items.

9. The device as set forth in claim 7, wherein if spatial ability is chosen as the ability to be tested then the plurality of item types consists of assembly items and cube folding items.

10. The device as set forth in claim 5, wherein the item is created according to constraints which limit combinations of objects and attributes that produce ineffective items.

11. The device as set forth in claim 5, further comprising an item image module operable to create an image file of the item in a standard image file format.

12. The device as set forth in claim 5, further comprising an item structure module operable to create a specification code file that can be used to recreate the item.

13. A computer program for creating a non-verbal test item to target a level and a cognitive source of item difficulty, the program comprising:
   a test configuration module operable to allow a user the choose one of a plurality of item types and one of a plurality of libraries of objects and attributes;
   an item specification module operable to allow a user the choose one of a plurality of blueprints for the chosen item type, wherein each blueprint targets a specific level and cognitive source of item difficulty according to research;
   an item creation module operable to create the item by randomly selecting objects and attributes from the chosen library and according to the chosen blueprint; and
   an output module operable to create a file of the item.

14. The computer program as set forth in claim 13, wherein the plurality of item types the user is allowed to choose from is dependant upon which one of a plurality of abilities to be tested is chosen.

15. The computer program as set forth in claim 14, wherein the plurality of abilities to be tested consists of analytic reasoning and spatial ability.

16. The computer program as set forth in claim 15, wherein if analytic reasoning is chosen as the ability to be tested then the plurality of item types consists of 2×2 matrix completion items, 3×3 matrix completion items, analogy items, and classification items.

17. The computer program as set forth in claim 15, wherein if spatial ability is chosen as the ability to be tested then the plurality of item types consists of assembly items and cube folding items.

18. The computer program as set forth in claim 13, wherein the item is created according to constraints which limit combinations of objects and attributes that produce ineffective items.

19. The computer program as set forth in claim 13, wherein the output module comprises an item image module operable to create an image file of the item in a standard image file format.

20. The computer program as set forth in claim 13, wherein the output module comprises an item structure module operable to create a specification code file that can be used to recreate the item.

* * * * *